United States Patent Office 3,262,847
Patented July 26, 1966

3,262,847
CALCIUM SALT OF DEXTRAN FOR TREATING CATTLE DELIVERY PARESIS
Per Gustaf Magnus Flodin, Perstorp, and Johan Alfred Olof Johansson and Henning Lars-Erik Johansson, Uppsala, Sweden, assignors to Aktiebolaget Pharmacia, a company of Sweden
No Drawing. Filed Nov. 26, 1962, Ser. No. 240,167
3 Claims. (Cl. 167—53)

INTRODUCTION

This invention pertains to novel calcium metal salts of dextrans and aqueous solutions containing such salts. The invention also relates to compositions of matter containing the novel calcium metal salts of dextrans and a pharmaceutical carrier. More particularly, the invention pertains to a composition of matter adapted to be used for the treatment of hypocalcemic conditions in the living body, comprising the novel calcium metal salts of dextrans, if desired, in combination with calcium propionate, especially for the treatment of cattle delivery paresis. The invention further pertains to a new useful method of preparing the mixture of novel calcium metal salts of dextrans.

BACKGROUND

In the human and veterinary medicine fields, it has been the practise for a long time to use calcium metal componds for the treatment of certain diseases, said calcium metal compounds being preferably administered parenterally itno the body in the form of aqueous solutions thereof. In the human medicine field, it has been the practise to remove different kinds of allergic conditions by injecting aqueous solutions of calcium metal salts into the body. In this connection, it has been found that the body is sensitive to calcium metal compounds, and this especially applies to such compounds which are present in too ionized form in aqueous solution. On the other hand, it has been found necessary that the calcium metal compound should be ionized to a certain degree, in order that it may function in the intended way. By a chemist's manner of expression, the matter might be expressed that a calcium metal compound, in order to be utilizable for calcium-therapeutic purposes, should have a complex constant, in aqueous solution, within certain definite, rather narrow limits to provide the indicated balance between the two properties.

PRESENT STAND OF TECHNICS

For the preparation of aqueous solutions of calcium metal compounds adapted to be used for therapeutic purposes, calcium gluconate, calcium levulinate, calcium borogluconate, the calcium metal complex of ethylene diaminotetraacetic acid, and calcium propionate have been used for a long time. Of these compounds, it can be said that the calcium metal complex of ethylene diaminotetraacetic acid holds the calcium so strongly bound that the compound does not function satisfactorily when introduced into the body, while, on the other hand, the other four compounds are unsatisfactory, because they yield too high a concentration of ions in their aqueous solution. Because of the poor solubility of many therapeutically used calcium metal salts, especially the calcium gluconate and related compounds, they must be administered clinically as over-saturated solutions with serious risks of untoward reaction.

THE OBJECTS OF THE INVENTION

A primary object of this invention is to provide calcium metal compounds eliminating the disadvantages referred to. A second object of this invention is to provide an aqueous solution containing calcium metal compounds, adapted to be used for the treatment of hypocalcemic conditions in the living body e.g. cattle delivery paresis. A still further object is to provide a composition of matter which is useful for the treatment of cattle delivery paresis. An object of the invention is also to provide a novel improved method for the preparation of the novel calcium metal salts of dextrans.

THE INVENTION BROADLY

The calcium metal compounds according to the present invention are broadly calcium metal salts of dextrans containing, on an average, from 0.5 to 2.0, inclusive, carboxymethyl groups per anhydro-glucopyranosic unit, the molecular weight of said dextrans being, on an average, no more than 20,000. Preferably the average molecular weight of said dextran should be in the range of from 2,000 to 10,000, inclusive.

PREPARATION OF THE MIXTURE OF NOVEL COMPOUNDS

In general, it can be said that methods which are commonly used to produce ethers of dextrans can be used to introduce the carboxy-methyl groups into the dextrans. One method is, for example, to treat dextran with the sodium metal salt of chloroacetic acid to obtain the sodium salt of carboxy-methyl dextran. This salt, which is in fact a mixture of salts of carboxy methyl dextrans having different molecular weights, is then reacted with a calcium metal salt in solution, whereupon the calcium metal salts of the carboxy-methyl dextrans are recovered, preferably by precipitating them with a solvent miscible with the solvent of the solution and in which the desired compounds are insoluble. For example, if the conversion is carried out in an aqueous solution the compounds can be recovered by adding a lower alkanol such as ethyl alcohol. A novel method which has now been used to produce the novel compounds according to the invention is to start from a mixture of dextrans having the desired molecular weights and react it with haloacetic acid, preferably chloroacetic acid, in the presence of calcium hydroxide in aqueous solution to produce directly the desired calcium metal salts of carboxy-methyl dextrans, whereupon the salts are precipitated by adding thereto a solvent miscible with water in which the salts are less soluble such as lower alkanols, preferably ethyl alcohol. The latter method has proved excellent from a technical viewpoint.

More particularly, this method is carried out in the following manner. A fraction of dextrans having their average molecular weight in the range of from 3,000 to 5,000, is dissolved in water to a concentration of about 20 percent. Calcium hydroxide is added in solid form and chloroacetic acid is then poured in. The mixture is heated to 60–90° C. with agitation, until the reaction is complete. To the reaction mixture is added water, and the diluted solution is then neutralized with hydrochloric acid, whereupon ethyl alcohol is added to precipitate the calcium metal salts of carboxy-methyl dextrans in a rapidly crystallizing form. The precipitate is recovered and dissolved in water to free them from impurifying substances, particularly calcium chloride. The concentration of dextran in the starting solution thereof can vary within broad limits, but is preferably in the range of from 10 to 35 percent (weight/volume). The haloacetic acid should be added in excess of what is stoichiometrically required to introduce the desired number of carboxymethyl groups in the dextran, it being, however, not necessary to use more than three times the theoretical amount. The best conditions will be attained with about from 1.5 to 2.0 times the theoretical amount. The calcium hydroxide should be added in an at least 10 percent excess of what is required theoretically to neutralize the chloroacetic acid and to accept the hydrogen chlorides liberated in the reaction. When substituting the calcium salt of chloroacetic acid for the free acid in the above reaction, the amount of calcium hydroxide can be lowered considerably. The reaction temperature is in the range of from 40 to 100° C., preferably between 60 and 90° C. Depending on the reaction temperature, the reaction time will usually be in the range of from 6 to 48 hours. After the reaction has taken place, the reaction mixture is diluted, neutralized with a mineral acid, and purified to remove the calcium chloride formed as a result of the substitution and glycolic acid formed as a by-product.

Independent of the method used for the preparation of the novel compounds, the latter can be refined by re-precipitation, for example by first dissolving them in a suitable solvent, such as water, and then precipitating them by adding a solvent miscible therewith such as ethyl alcohol. Other refining methods may also be applied, and it should especially be noted that the mixture of calcium metal salts, according to the invention, may be subjected to gel filtration in order to separate these salts from other salts formed in the reaction.

PROPERTIES OF THE NOVEL CALCIUM METAL SALTS

The novel calcium salts are a yellowish powder which is soluble in water with a negative solubility coefficient. The solubility will be increased in the presence of salts. The calcium is bound in complex form, but relatively weakly. The mean value for the complex constant is $C=4.3 \times 10^3$. The equivalent weight for the carboxyl group is e.g. 175–200. The content of calcium (Ca) is 10–12 percent. As the substance is hygroscopic, it has to be protected carefully against moisture during storage and transport. An aqueous 10 percent solution of the novel calcium metal compounds is stable at room temperature. The solidifying point for this solution is $-0.3°$ C. A valuable property of the novel compounds is their great solubility in water. The compounds will dissolve in water to form solutions of concentrations as high as from 90 to 100, inclusive, grams per 100 ml. The great solubility of the novel compounds in water represents a valuable advantage, because it is possible to prepare for injection utilizable aqueous solutions which are not over-saturated with respect to the calcium-containing component as is the case with many of the calcium salt solutions used up to now for the same purpose.

PREPARATION OF COMPOSITIONS CONTAINING THE NOVEL CALCIUM COMPOUNDS

The invention also includes the conversion of the calcium carboxy-methyl dextrans into suitable forms of administration. The most usual of these forms is the injection solution. For the preparation of such a solution, the calcium carboxy-methyl dextran is dissolved in sterile water, if desired, with the addition of other ingredients such as glucose and sorbitol. As pointed out hereinafter, aqueous solutions of calcium carboxy-methyl dextran can be used for the treatment of cattle delivery paresis. In this case a prompt response is demanded, but cannot be achieved by using a solution containing calcium carboxy-methyl dextran as the only calcium containing ingredient. By combining the calcium dextran salts according to the invention with the more readily dissociable calcium propionate a very favourable combination of immediate response and sustained effect can be attained without risk to the heart which may follow upon the injection of an aqueous solution of calcium propionate alone. For the manufacture of preparations for oral use, the novel compounds are mixed with pharmaceutically usable adjuvants and carriers. For such administration may be mentioned syrupy liquid preparations. For the treatment of certain kinds of cattle delivery paresis also magnesium salts, such as magnesium chloride, may be added to the compositions.

PHARMACOLOGY OF THE NOVEL CALCIUM METAL COMPOUNDS

Toxicological studies have been carried out on the novel calcium metal compounds.

The toxicity of an aqueous 10 percent solution of calcium carboxy-methyl dextran prepared from dextran having an average molecular weight of 3,400, said carboxy-methyl dextran having an equivalent weight of 175, was compared with that of other 10 percent calcium preparations available commercially. The preparations were injected intravenously, at a rate of 0.10 ml./min. into albino mice weighing 18 to 35 g. Observation time two weeks.

| Preparation | Dose, mg./kg. | No. mice | No. deaths |
|---|---|---|---|
| According to invention | 100 | 10 | 0 |
|  | 200 | 10 | 1 |
|  | 300 | 10 | 2 |
| 10 percent preparation containing calcium gluconate | 100 | 10 | 0 |
|  | 200 | 11 | 6 |
|  | 300 | 10 | 5 |

Aqueous 10 percent solutions of the novel calcium metal compounds have been tested clinically, trials having been carried out on a large number of paresis cases. The usual type has been paresis puerperalis, called cattle delivery paresis, although some cases of grass tetany have also been treated. In this connection, it proved that by injecting aqueous 10 percent solutions of the compounds in cows suffering from paresis, an effective concentration of calcium could be maintained in serum for a sufficiently long period to eliminate the disease completely. In comparison with known preparations, those covered by the invention have proved not to exhibit any effect on the heart of the animals. Furthermore, the effect is of longer duration and the novel compounds can be administered more rapidly.

EXAMPLES

The following examples are illustrative of preferred embodiments of the present invention.

Example 1

800 g. of dextran having an average molecular weight of 3,400 are dissolved in 1,600 ml. of water. To this solution are first added 600 g. of calcium hydroxide and then 1,300 g. of the calcium metal salt of chloroacetic acid. This mixture is then heated at 78° C. for 16 hours to cause the reaction to take place. The reaction mixture is diluted with 4 l. of water and the solution obtained is neutralized with 600 ml. of aqueous 5 N hydrochloric acid. The neutralized solution is filtered, and to the filtrate is added ethyl alcohol in a sufficient amount to precipitate the calcium carboxy-methyl dextran. The product first appears in gel form, but crystallizes later on. The product is reprecipitated twice from water, and the crystals are dried in vacuum at 60° C. The yield is 1,200 g. of a substance containing 11.1 percent of calcium and having an equivalent weight (content of carboxyl groups) of 175.

Example 2

A solution for injection was made up by mixing together:

Calcium carboxy-methyl dextran _____ g__ 15
Sterile water to 100 ml.

This solution could be sterilized by heating without difficulty and proved to be useful for the treatment of hypocalcemic conditions in the living body. Also, other hypocalcemic conditions could be removed effectively.

*Example 3*

A solution for injection was made up by mixing together:

|  | G. |
|---|---|
| Calcium carboxy-methyl dextran | 15 |
| Calcium propionate | 6 |
| Sterile water to 100 ml. | |

The solution was placed in infusion bottles of a sufficient volume to contain 450 ml. and sterilized. It proved to be useful for the treatment of hypocalcemic conditions where a rapid response is demanded.

*Example 4*

A solution for injection was made up by mixing together:

|  | G. |
|---|---|
| Calcium carboxy-methyl dextran | 10 |
| Calcium propionate | 5 |
| Glucose | 20 |
| Sterile water to 100 ml. | |

The solution was placed in infusion bottles of a sufficient volume to contain 450 ml. and sterilized. It proved excellently suitable for the treatment of cattle delivery paresis.

*Example 5*

A solution for injection was made up by mixing together:

|  | G. |
|---|---|
| Calcium carboxy-methyl dextran | 10 |
| Calcium propionate | 5 |
| Sorbitol (aqueous 70 percent solution) | 30 |
| Sterile water to 100 ml. | |

The solution was placed in infusion bottles of a sufficient volume to contain 450 ml. and sterilized. It proved to be excellently suitable for the treatment of cattle delivery paresis.

*Example 6*

A solution for injection was made up by mixing together:

|  | G. |
|---|---|
| Calcium carboxy-methyl dextran | 6.5 |
| Calcium propionate | 5.3 |
| Magnesium chloride | 3.3 |
| Glucose | 22.2 |
| Sterile water to 100 ml. | |

The solution was placed in infusion bottles of a sufficient volume to contain 450 ml. of it and sterilized. It proved excellently suitable for the parenteral treatment of diseases associated with depression of blood calcium and magnesium level (paresis with tetany, grass tetany).

*Example 7*

A composition for oral use was made up by mixing together:

| Calcium carboxy-methyl dextran | g.. | 70 |
|---|---|---|
| Aroma, Sweetening, Q.s. | | |
| Water to 100 ml. | | |

The composition, which had a syrupy consistence, proved to be suitable for the oral treatment of hypocalcemic conditions.

Those skilled in the chemical arts, and particularly in the art to which this invention pertains, will readily appreciate that many modifications of the basic invention set forth here are possible. For example, it would not involve invention to try closely related compounds in view of the present broad disclosure or in trying amounts different than those disclosed. All such obvious modifications would not avoid infringement under the well known "doctrine of equivalents."

What we claim is:

1. A therapeutic composition of matter adapted to the treatment of hypocalcemic conditions in the living body consisting of an injectable aqueous vehicle containing water soluble calcium metal salts of dextrans having, on an average, from 0.5 to 2.0, inclusive, carboxy-methyl groups per anhydroglucopyranosic unit, the average molecular weight of said dextrans being in the range of from 2,000 to 5,000, inclusive, and calcium propionate.

2. A therapeutic composition of matter adapted to the treatment of cattle delivery paresis, consisting of an injectable aqueous vehicle containing water soluble calcium metal salts of dextrans having, on an average, from 0.5 to 2.0, inclusive, carboxy-methyl groups per anhydroglucopyranosic unit, the average molecular weight of said dextrans being in the range of from 2,000 to 5,000, inclusive, and calcium propionate.

3. A method for the treatment of cattle delivery paresis comprising administering to the cattle a composition consisting of an injectable aqueous vehicle containing water-soluble calcium metal salts of dextrans having, on an average, from 0.5 to 2.0, inclusive, carboxy-methyl groups per anhydroglucopyranosic unit, the average molecular weight of said dextrans being in the range of 2,000 to 5,000 inclusive.

References Cited by the Examiner

UNITED STATES PATENTS 2,876,165  3/1959  Novak _____ 167—92

OTHER REFERENCES

Keeping Livestock Healthy, 1942, U.S.D.A., pages 533–536.

Merck Index, Seventh Edition, page 197 (1960).

JULIAN S. LEVITT, *Primary Examiner.*

FRANK CACCIAPAGLIA, Jr., LEWIS GOTTS,
*Examiners.*

SAM ROSEN, *Assistant Examiner.*